US010706886B1

(12) United States Patent
Parkash et al.

(10) Patent No.: US 10,706,886 B1
(45) Date of Patent: *Jul. 7, 2020

(54) SCHEDULING LOW-PRIORITY DISK SEEKS FOR MULTI-ACTUATOR DATA STORAGE DEVICE

(71) Applicant: Seagate Technology LLC, Cupertino, CA (US)

(72) Inventors: Vidur Fnu Parkash, Shakopee, MN (US); Mark Allen Gaertner, Vadnais Heights, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,380

(22) Filed: Mar. 29, 2019

(51) Int. Cl.
| | | |
|---|---|---|
| *G11B 5/54* | (2006.01) | |
| *G11B 21/10* | (2006.01) | |
| *G11B 5/012* | (2006.01) | |
| G11B 5/55 | (2006.01) | |
| G11B 5/48 | (2006.01) | |
| G06F 3/06 | (2006.01) | |
| G11B 27/36 | (2006.01) | |

(52) U.S. Cl.
CPC ............ *G11B 21/106* (2013.01); *G11B 5/012* (2013.01); *G06F 3/0676* (2013.01); *G11B 5/4813* (2013.01); *G11B 5/4886* (2013.01); *G11B 5/5547* (2013.01); *G11B 5/5578* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 5,355,486 A | 10/1994 | Cornaby | |
| 5,610,808 A * | 3/1997 | Squires | G06F 3/0601 700/2 |
| 6,239,932 B1 * | 5/2001 | Hoogendoorn | G11B 5/584 360/64 |
| 6,560,075 B2 | 5/2003 | Price et al. | |
| 6,735,032 B2 * | 5/2004 | Dunn | G11B 5/59633 360/31 |
| 6,847,504 B1 | 1/2005 | Bennett et al. | |
| 8,145,823 B2 | 3/2012 | Olesinki et al. | |
| 9,830,939 B1 * | 11/2017 | Hamilton | G11B 5/5578 |
| 9,928,861 B1 * | 3/2018 | Erden | G11B 5/5534 |
| 10,049,691 B1 * | 8/2018 | Gaertner | G11B 5/5547 |
| 10,090,010 B1 * | 10/2018 | Erden | G11B 5/58 |
| 10,192,576 B1 * | 1/2019 | Gaertner | G11B 5/5547 |
| 10,424,328 B1 * | 9/2019 | Gaertner | G11B 5/4886 |
| 2008/0123213 A1 | 5/2008 | Craig et al. | |

* cited by examiner

*Primary Examiner* — Tan X Dinh
(74) *Attorney, Agent, or Firm* — Mueting Raasch Group

(57) ABSTRACT

A first time period is determined during which a first head driven by a first actuator will be performing a track-following operation. A second time period is also determined during which a second head driven by a second actuator will be performing a low-priority disk access operation that includes a seek. The first and second actuators are independently movable such that the first and second disk access operations are capable of being performed in parallel. If it is determined that the seek of the second head will impact servo control of the track-following operation of the first head, a start time of the seek of the second head is changed to correspond to a time that mitigates impacts to the track-following operation of the first head.

20 Claims, 6 Drawing Sheets

SCHEDULING LOW-PRIORITY DISK SEEKS FOR MULTI-ACTUATOR DATA STORAGE DEVICE

SUMMARY

The present disclosure is directed to scheduling low-priority disk seeks for multi-actuator data storage device. In one embodiment, a first time period is determined during which a first head driven by a first actuator will be performing a track-following operation. A second time period is also determined during which a second head driven by a second actuator will be performing a low-priority disk access operation that includes a seek. The first and second actuators are independently movable such that the first and second disk access operations are capable of being performed in parallel. If it is determined that the seek of the second head will impact servo control of the track-following operation of the first head, a start time of the seek of the second head is changed to correspond to a time that mitigates impacts to the track-following operation. This changing of the second seek could also or instead involve changing a seek profile, e.g., slowing acceleration and/or deceleration of the seek of the second head.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disk drives (HDDs). Additional HDD features described herein, generally described as "parallelism" architectures, can be used to improve HDD performance measures such as IOPS and latency. In some implementations, parallelism architectures utilize multiple read/write heads in parallel. Such parallelism can increase the rate of input/output operations (IOPS) and thereby speed up certain operations. For example, the data read from two heads (reading from the same disk surface or different disk surfaces) can be combined together into a single stream, thereby doubling the throughput rate of data sent to the host. In other implementations or modes, different heads can service different read or write requests at the same time, thereby reducing overall latency, e.g., for random data access requests.

In embodiments described below, a hard disk drive includes multiple heads driven by different actuators (e.g., voice coil motors or VCMs) that can read from or write to one or more disks simultaneously. This may include separate and independent reading/writing, such as heads that are servicing different read/write requests. This may also include separate and dependent reading/writing, e.g., where parts of a single stream of data are being handled by different heads at the same time. The parallelism architectures can be extended to other components that operate in the HDD, including system controllers, servo controllers, read/write channels, host interfaces, caches, etc.

In an HDD with multiple actuators, the movement of one of the actuators can interfere with the operation of the other actuator(s). The force exerted by an actuator can cause mechanical disturbance/vibration that affects other actuators. The greatest forces intentionally exerted during normal operation include forces applied during seek acceleration and deceleration. These forces are most likely to impact the ability to track settle and track follow on the other actuator(s). For certain operations such as settling and following operations while writing, the constraints may be tighter than other operations (e.g., reading) due to the possibility of destroying previously written data due to mistracking. If these operations are disturbed significantly, then the write operation will be delayed or suspended resulting in degraded performance.

In embodiments described below, scheduling decisions of actuators is translated into time regions of potential disturbance to other actuator(s) and disturbance susceptibility. Scheduling on each actuator uses the disturbance factors of the other actuator(s) to determine the optimal operation to schedule and its corresponding seek behavior. In this way, cross-actuator disturbance can be minimized resulting in an increase in performance for some operations, e.g., write operations.

Figure 1:
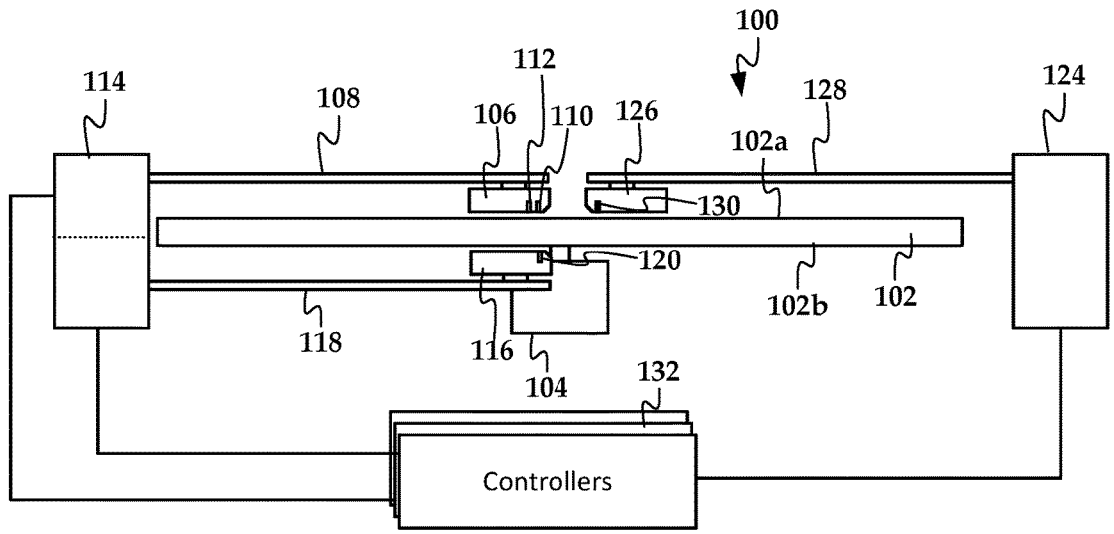
FIG. 1 is a diagram of an apparatus according to an example embodiment.

In FIG. 1, a diagram illustrates an apparatus 100 with parallelism features according to example embodiments. The apparatus 100 includes at least one magnetic disk 102 driven by a spindle motor 104. A head 106 (also referred to as a read/write head, read head, write head, recording head, etc.) is held over a first surface 102a of the disk 102 by an arm 108. An actuator 114 moves (e.g., rotates) the arm 108 to place the head 106 over different tracks on the disk 102. In one embodiment, the head includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102.

The apparatus 100 includes a second head 116 supported by a second arm 118. The second head 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The head 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third head 126 supported by a third arm 128. The third head 126

(and its associated actuation hardware) may be included instead of or in addition to the second head 116. The third head 126 is held over the first surface 102a of the disk 102 as a second actuator 124 causes the third arm 118 to move to different tracks on the disk 102. The arm 128 and actuator 124 move independently of arm 108 and actuator 114. The head 126 includes read and/or write transducers 130. The transducers 130 are capable of reading from and/or writing to disk surface 102a simultaneously with transducers 110, 112 of first head 106.

In the examples shown in FIG. 1, more than one disk 102 may be used, and the actuators 114, 124 may be coupled to additional arms and heads that access some or all of the additional disk surfaces. In this context, "accessing" generally refers to activating a read or write transducer and coupling the transducer to a read/write channel. Independently movable heads that utilize a split actuator 114 may generally simultaneously access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time, as well as accessing different surfaces at the same time.

One or more controllers 132 are coupled to the respective actuators 114, 124 and control movement of the actuators 114, 124. The controllers 132 may include systems on a chip that perform such operations as servo control, encoding and decoding of data written to and read from the disk 102, queuing and formatting host commands, etc. As pertains to the discussion below, the one or more controllers 132 have the ability to execute multiple media read/write operations concurrently.

Seek acceleration and deceleration of one actuator potentially disturbs operations on other actuators and any heads attached to those actuators. The amount of disturbance may be unique for each actuator and vary based on the rate of acceleration and deceleration as well as other factors such as radial position. Some operations may be more susceptible to disturbance than other operations. The amount of susceptibility is related to the phase of the operation, such as seek settle and write track follow. Susceptibility may also vary per actuator, radial position over the disk of the heads, and other factors.

It will be inevitable that there will be some cross-disturbance between actuators within the same drive housing, and so the drive may take some precautions to mitigate ill-effects of the disturbance. For example, a disturbance that causes mistracking during reading can be mitigated by re-reading any sectors affected by the mistracking. During writing, mistracking may lead to the writing being aborted so that, e.g., adjacent track data does not get accidentally impaired or overwritten. These mitigation techniques can be effective, but time consuming. Thus, the need to mitigate for inter-actuator coupling can impact the improvements sought by using two actuators in parallel on the drive.

Figure 2:
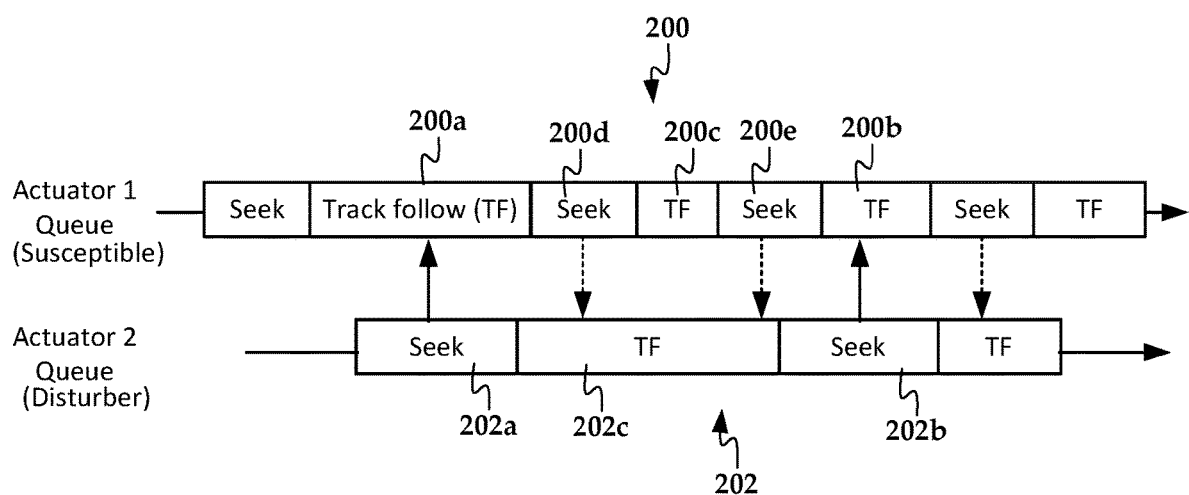
FIGS. 2, 3A, 3B, 4A, 4B and 4C are block diagrams showing queued write commands for a dual-actuator storage device according to example embodiments.

In FIG. 2, a block diagram shows managing disturbance between two actuators according to an example embodiment. Blocks 200 represent a sequence of operations of a first actuator that is susceptible to disturbance, and blocks 202 represent operations of a second actuator of the same drive that could potentially cause the disturbance. These blocks 200, 202 can be derived from a command queue, e.g., a write queue that is used by a controller to initiate a write sequence onto the disk(s). By examining each command along with other information such as disk speed track locations to which the head will seek, an estimate of times when each block will start and end can be obtained.

In one example, the scenario shown in FIG. 2 may involve determining that the first, susceptible, actuator has queued up the input/output (I/O) commands 200 while the second, disturbance-producing, actuator is idle and normally scheduled to perform background operations 202 when idle. Further, by analyzing the predicted times that each operation in the sequences 200, 202 will occur such that it can be determined if and when a seek of the operations 202 may occur during a track following of the susceptible operations. For example, as indicated by solid arrows, two seeks 202a, 202b scheduled for the second actuator will occur during track-following periods 200a, 200b of the first actuator. To mitigate impact to track following on the first actuator, it is desirable to reschedule the aggressor seeks 204, 205, so that the seek energy is delivered to the first actuator when it is not track following, where impact to the head of the first actuator would be minimal. Note that similar concepts may be applied to read operations being performed by one or both of the actuators. Therefore, any examples described herein regarding write operations, write command caches, etc. can be understood to also apply to read operations, read command caches, etc., unless otherwise noted.

Figure 3A:
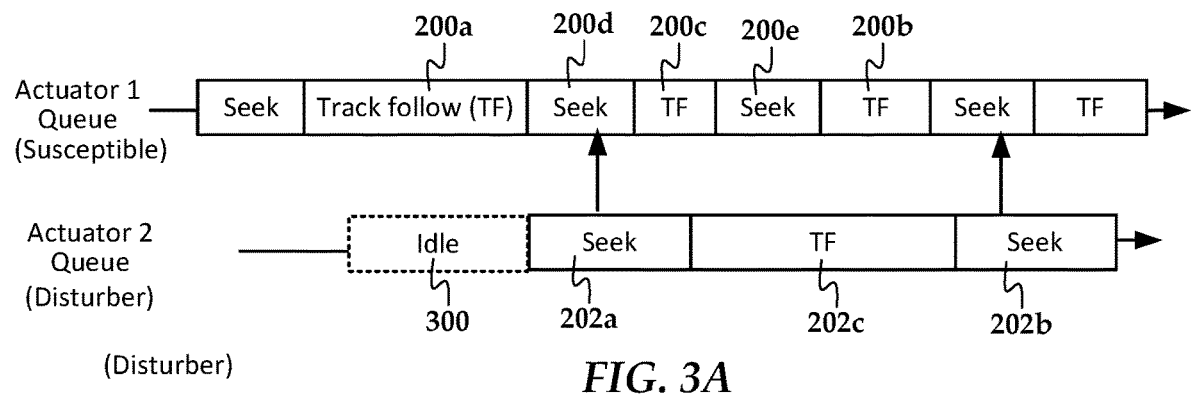

In FIG. 3A, a diagram shows an example of how rescheduling the seeks 204, 205 of the second actuator can reduce interfering with track-following operations of the first actuator. Block 300 represents a delay that has been introduced into the second actuator's write queue. As a result, at least the start of the seeks 202a, 202b do not overlap with track-following operations 200a, 200b. Note that the ending of the seeks 202a, 202b may still overlap with track following operations, such as the end of seek 202a occur during track-following operation 220c. This could still result in disturbance during track-following operation 202c due to the deceleration of the actuator at the end of the seek. One way to deal with this is to decrease the rate of deceleration of the second actuator at the end of the seeks 202a, 202b.

Figure 3B:
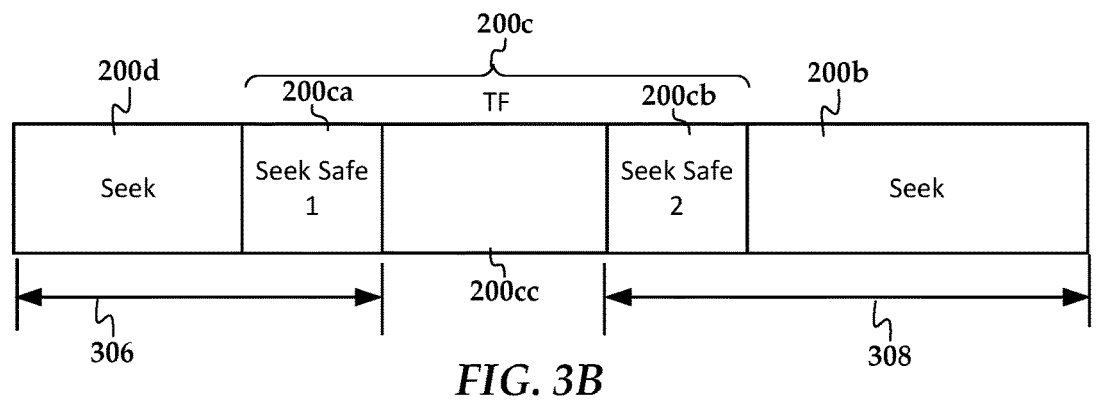

In FIG. 3B, a diagram shows close up of track following operation 200c and seeks 200d, 200e from FIGS. 2 and 3A. This track following region 200c on the susceptible actuator can be further subdivided into "seek-safe" sections 200ca, 200cb and an unsafe seek section 200cc. These safe sections 200ca 200cb can be attributed to intrinsic delays in firmware when the high priority actuator is not actually transferring data to/from the media. As indicated by lines 306, 308, the seek safe sections 200ca, 200cb can be used to extend the time for making coordinated seek movements as described in the above.

Figure 4A:
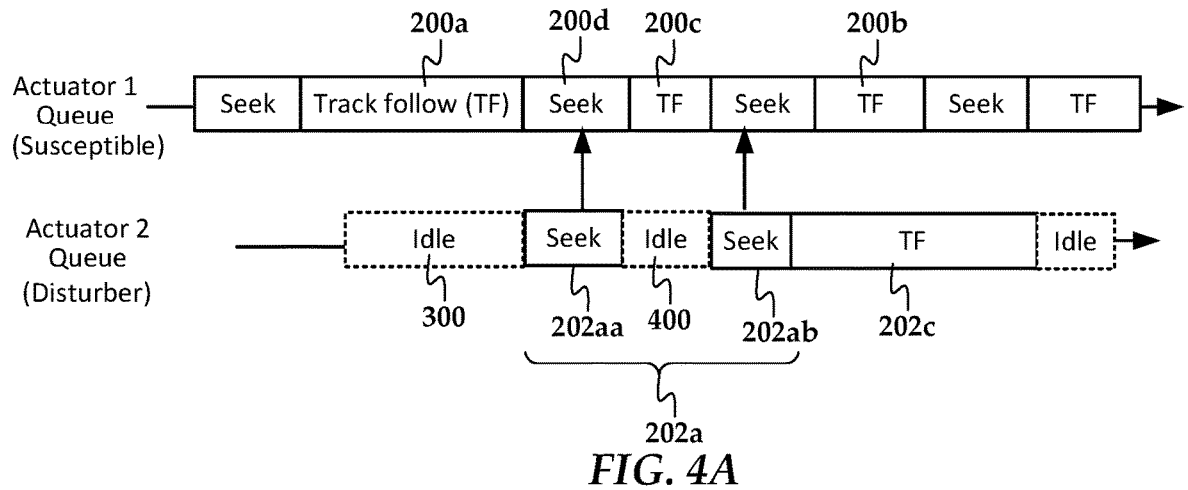

Another way to deal with seeks of the second actuator that are longer than that of the first is to break the longer seeks into multiple seeks. An example of this is shown in FIG. 4A, which is a diagram of write operations shown in FIG. 3 further modified according to an example embodiment. As with FIG. 3A, a delay 300 is introduced before performing seek 202a. In order to prevent the end of the seek 202a from interfering with track following operation 200c, it is broken into two smaller seeks 202aa, 202ab. A delay 400 between the seeks 202aa, 202ab allows the track following operation 200c to continue without acceleration or deceleration of the second actuator during the operation 200c. During the delay 400, the second actuator may idle while following an intermediate track between the beginning and end of the seek.

Figure 4B:
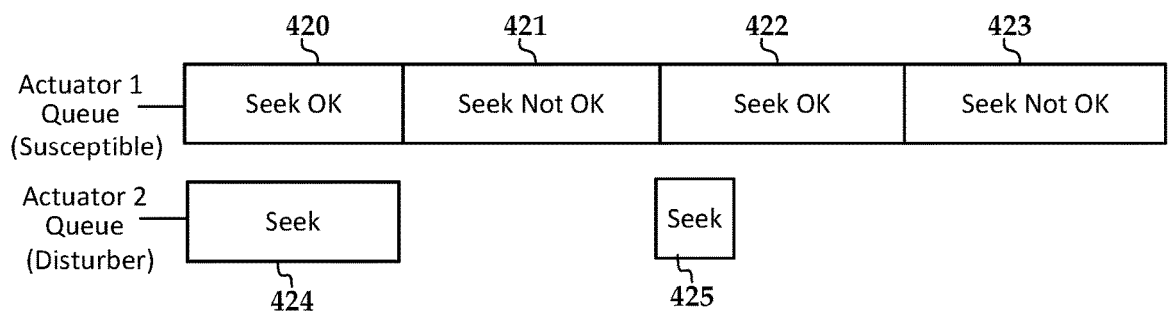
Figure 4C:
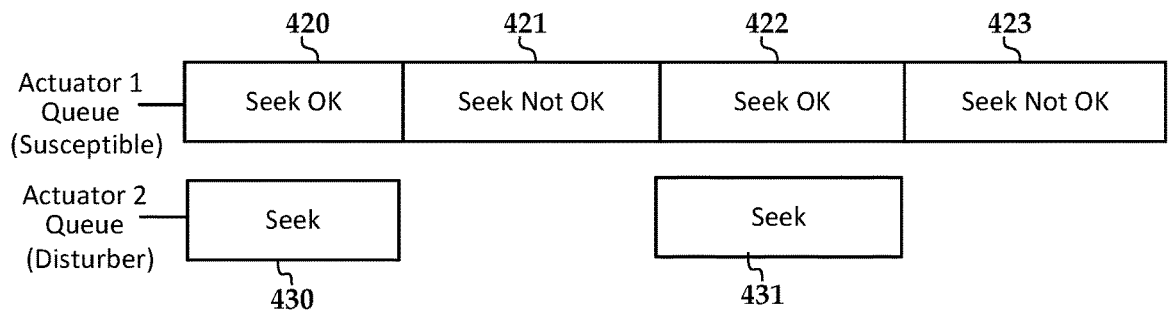

In FIGS. 4B and 4C, diagrams illustrate additional ways an aggressor seeks can be broken up according to other example embodiments. Blocks 420-423 represent times when a seek of the second actuator is 'OK' or 'not OK.' Blocks 420, 422 could represent seeks of the first actuator and/or safe seek times during track following as shown in FIG. 3B. In FIG. 4B, the seek of the second actuator is broken into two time periods 424, 425, the latter of which completes within the seek OK time period 422. In addition to dividing the low priority operation of the second actuator into multiple seeks, the seek profile can be altered (e.g., slowed) to fully utilize the seek safe time windows 420, 422. This is shown in FIG. 4C, where the second actuator seek is broken into blocks 430, 431 that fully encompass seek OK times 420, 422. By slowing the low-priority seek to fit the known seek safe windows, advantages can be realized. For example, seek forces can be reduced due lower acceleration and deceleration rates of the second actuator, which can reduce power consumption, wear, and mechanical disturbance within and outside of the drive.

In reference again to FIG. 2, while the solid arrows indicate a disturbance originating from the second actuator that affects the first actuator, the dashed arrows indicate the inverse; namely, disturbances originating from the first actuator that affects the second actuator. Because operations of the second actuator in this scenario are of low-priority, it may be assumed that the second actuator can deal with the disturbances using existing servo control mechanisms. This may cause the operations of the second actuator to take longer, e.g., due to occasional mistracking, but this is acceptable because the second actuator has low-priority in this example. Even so, by moving the seeks of the second actuator to coincide with that of the first actuator, some of this inverse disturbance from the first actuator to the second actuator can be reduced. For example, in FIG. 3, after rescheduling operations of the second actuator, seek 200d of the first actuator now aligns with the seek 202a of the second actuator, thereby removing interference from this seek 200d on track-following operation 202c of the second actuator.

A hard drive system may maintain one or more write-data caches which are used to improve performance on disk writes. These write caches may be stored in volatile memory, flash memory, and/or media cache space reserved on the hard disk. Eventually these cached writes, are flushed out to (written to) the disk media at their target sectors. There may be no strict deadlines that have to be met for this flush to occur. In such a scenario, the strategy described above can be employed to schedule cache flush seeks using one actuator so as not to interfere with current operations on another actuator that operates in parallel. The seeks required to service these pending writes would be scheduled to coordinate with I/O activity on the other actuators and split into smaller seeks if needed.

Figure 5:
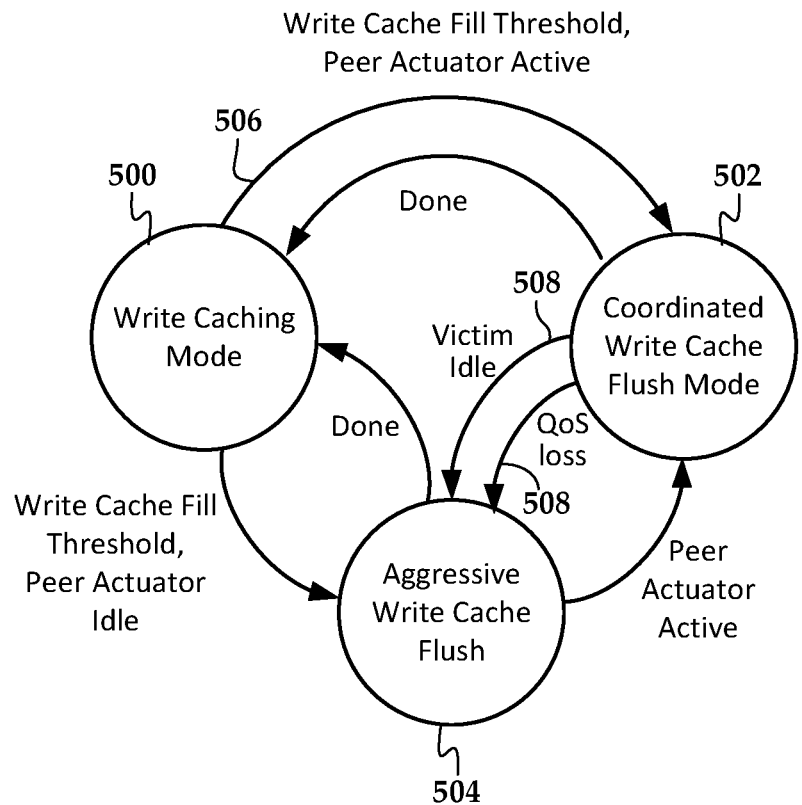
FIG. 5 is a state diagram showing various caching modes for a dual-actuator storage device according to example embodiments.

In FIG. 5, a state diagram shows how coordinated seeks can be managed according to an example embodiment. At state 500, write commands are cached to a cache medium as described above. Upon reaching a certain fill threshold as the cache accumulates more uncommitted data, it would enter one of the indicated cache flushing modes 502, 504. Assuming the peer actuator is actively performing I/O operations, transition 506 causes the actuator to enter a coordinated write cache mode 502 where it will coordinate its seeks with the peer actuator's seeks in a manner described above, e.g., as shown in FIGS. 3 and/or 4. If, in this mode, the peer actuator (indicated here as the "victim" actuator), goes idle, transition 508 occurs to state 504, in which the write cache is aggressively flushed without consideration of how it may affect the peer actuator.

It is expected that in mode 502, the speed of the write cache flush would be slower expected as compared to an un-coordinated flush as in mode 504. It is possible that during the flush operation more data is cached than can be written in mode 504, in which case quality of service (QoS) may suffer, e.g., causing a slowdown in the fulfillment of host write requests. If the rate of new data being cached is faster than rate of flush, transition 510 to mode 504 may occur to aggressively flush the cache contents. For this reason, the system may maintain a second threshold on the write cache fill which triggers transition 508, causing an exit out of coordinated seek mode 502 to flush the cache at maximum possible rate in mode 504.

Figure 6:
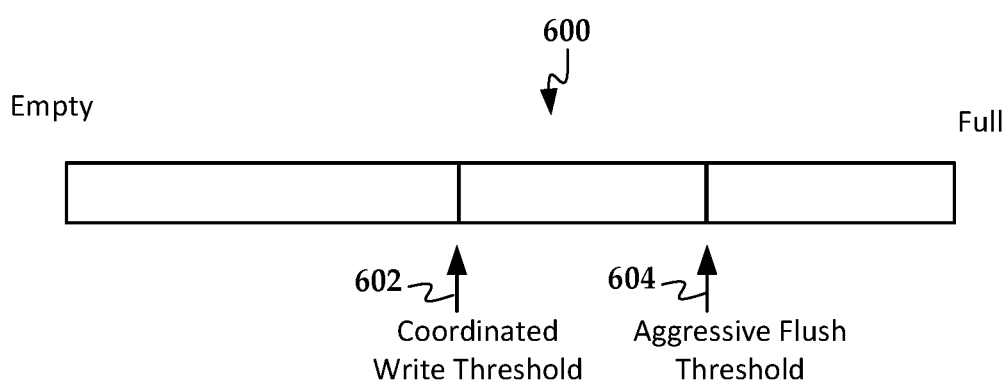
FIG. 6 is a diagram showing write queue flushing thresholds according to an example embodiment.

In FIG. 6, a diagram shows an example of two different thresholds that may be used in a multi-writer, multi-actuator write cache 600 according to an example embodiment. Generally, the cache 600 fills up from the left to right in this illustration. A coordinated write threshold 602 occurs when the cache 600 is less full, and triggers, e.g., transition 506 in FIG. 5. An aggressive flush threshold 604 occurs when the cache 600 is more full than threshold 602, and triggers, e.g., transition 508 in FIG. 5.

The algorithms described above can be applied to a multitude of cases when all actuators are servicing disk commands. For example, some implementations used some form of execution priority that is assigned to each command. The priority may be assigned by the host or by the drive itself. The concept of priority of a command would be related to its completion deadline. The algorithm can be applied, instead of or in addition to background or flush operations, to commands that are tagged with "low" priority levels. If the drive client is not sensitive to the execution deadline of this command, then the drive can schedule it at its own will, finding an opportunity to coordinate itself with the peer actuator.

In one example, the aggressor actuator (e.g., the second actuator in FIG. 2) enters the coordinated write cache flush mode when overall priority score 'S' in the actuator's disk queue falls below a threshold 'T,' where S is defined as in Equation (1) below, where $Len_n$ is the length and $PRI_n$ is the priority of each queued write request. A low score 'S' is generated if the aggressor's pending I/O is low priority and has short transfer lengths. Lower length seeks will fit into the victim's seeking windows much more easily.

$$S = \Sigma_n^N (Len_n \times PRI_n) \leq T \tag{1}$$

Figure 7:
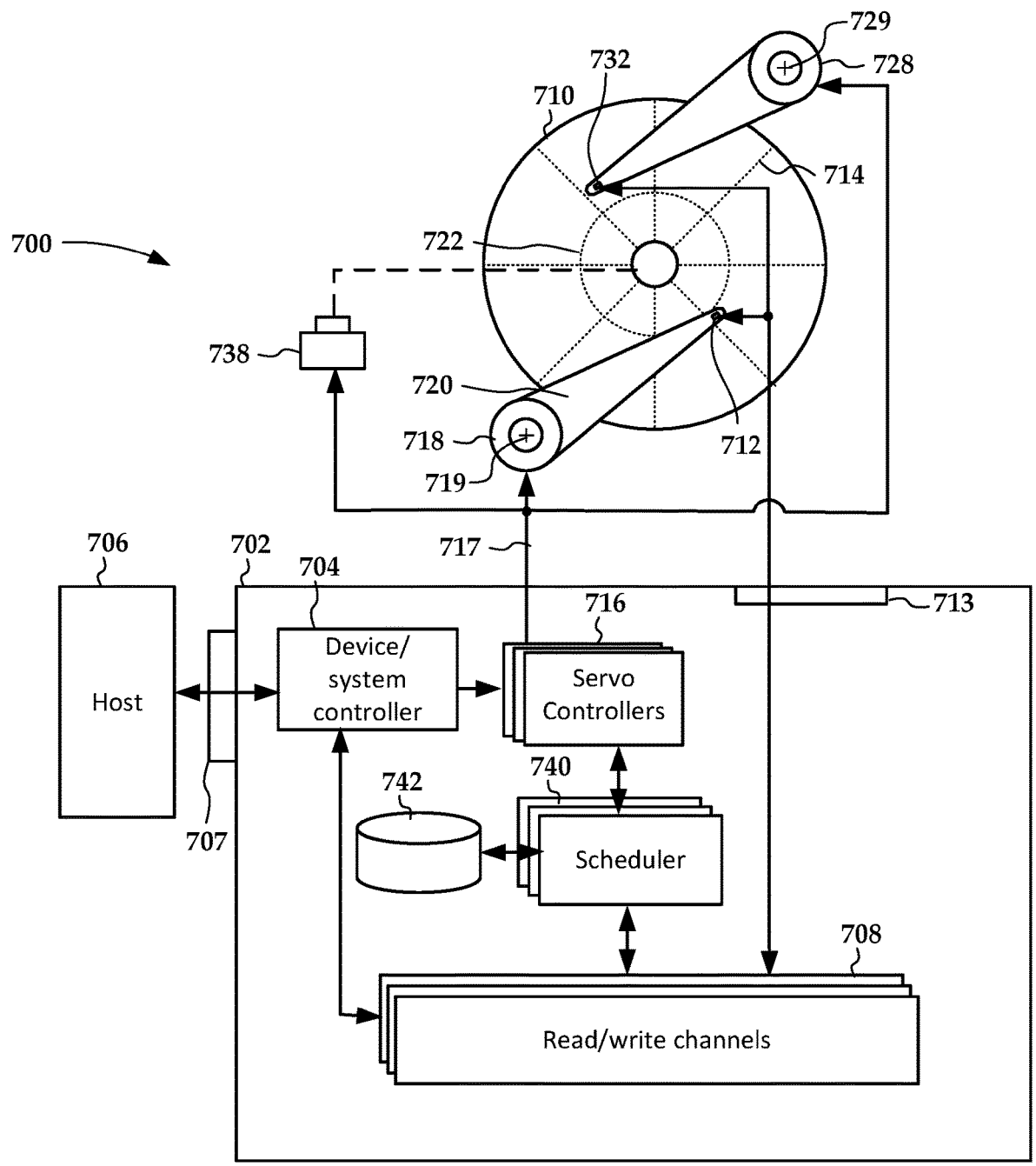
FIG. 7 is a block diagram of a system and apparatus according to an example embodiment.

In FIG. 7, a block diagram illustrates a data storage drive 700 that utilizes one or more actuators according to example embodiments. The apparatus includes circuitry 702 such as one or more device/system controllers 704 that process read and write commands and associated data from a host device 706 via a host interface 707. The host interface 707 includes circuitry that enables electronic communications via standard bus protocols (e.g., SATA, SAS, PCI, etc.). The host device 706 may include any electronic device that can be communicatively coupled to store and retrieve data from a data storage device, e.g., a computer, a server, a storage controller. The device controller 704 is coupled to one or more read/write channels 708 that read from and write to surfaces of one or more magnetic disks 710.

The read/write channels 708 generally convert data between the digital signals processed by the device controller 704 and the analog signals conducted through two or more heads 712, 732 during read operations. The two or more heads 712, 732 each may include respective read transducers capable of concurrently reading the disk 710, e.g., from the same surface or different surfaces. The read transducers may be configured to read in any mode, such as conventional single-track with single reader, or various TDMR modes like single track with multiple readers (MSMR) or multi-track with multiple readers (TDMR-MT). The two or more heads 712, 732 may also include respective write transducers that concurrently write to the disk 710. The write transducers may be configured to write using a HAMR energy source, and may write in various track configurations, such as conventional, SMR, and IMR.

The read/write channels 708 may include analog and digital circuitry such as digital-to-analog converters, analog-to-digital converters, detectors, timing-recovery units, error correction units, etc. The read/write channels 708 coupled to the heads 712, 732 via interface circuitry 713 that may include preamplifiers, filters, etc. As shown in the figure, the read/write channels 708 are capable of concurrently processing one of a plurality of data streams from the multiple heads 712, 732.

In addition to processing user data, the read/write channels 708 read servo data from servo marks 714 on the magnetic disk 710 via the read/write heads 712, 732. The servo data are sent to one or more servo controllers 716 that use the data to provide position control signals 717 to one or more actuators, as represented by voice coil motors (VCMs) 718. The VCM 718 rotates an arm 720 upon which the read/write heads 712 are mounted in response to the control signals 717. The position control signals 717 may also be sent to microactuators (not shown) that individually control each of the heads 712, e.g., causing small displacements at each read/write head.

The VCM 718 may be a stacked or split actuator, in which case two VCM parts are configured to independently rotate different arms about a common axis 719. In such a case, other heads (not shown) will access data on the disks simultaneously with that of heads 712, and these other heads may be coupled to circuitry 702 similar to illustrated head 732. In other embodiments, a second actuator, e.g., VCM 728, may independently and simultaneously rotate a second arm 730 about a second axis 729. Corresponding heads 732 may be rotated by the VCM 728 and may operate simultaneously with the heads 712 under commands from the one or more servo controllers 716.

One or more schedulers 740 access a common data structure 742 that access a common data store 742. This data store 742 may include susceptibility and disturbance structures as described above, or equivalents thereof. The schedulers 740 are operable by the controller 704 (or another processor or sub-processor) to determine time periods during which the multiple disk access operations will be performed. If it is found that that a target disk access operation will impact servo control of the other access operations, the target disk access operation is changed to reduce the impact to the servo control of the other disk access operations. This changing may include delaying the target operation, slowing down or speeding up the target operation, splitting a seek into parts with idling in-between, etc. In some cases, the target operation may have a high priority, in which case the other affect operations may be changed, e.g., delayed, paused, etc., while the high-priority operation operates unchanged.

Figure 8:
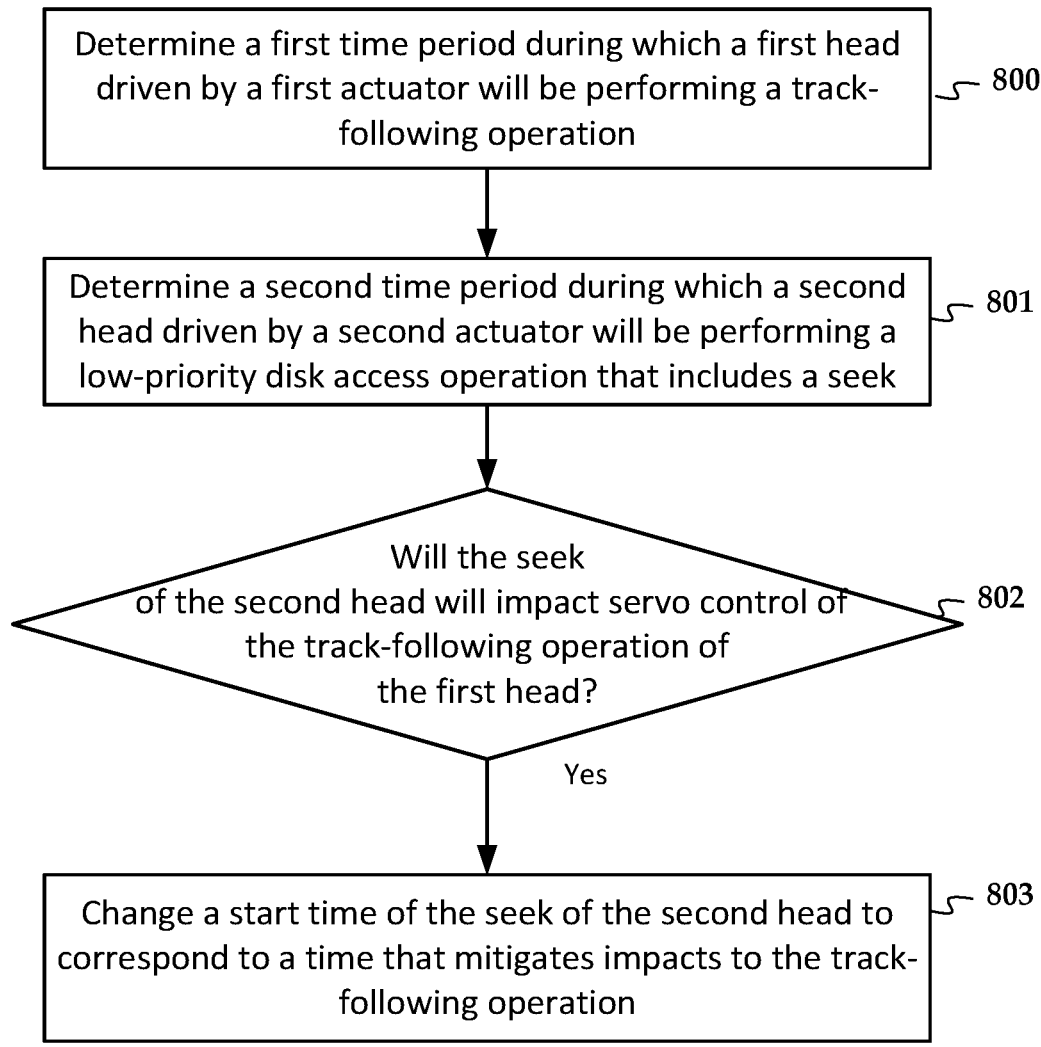
FIG. 8 is a flowchart of a method according to an example embodiment.

In FIG. 8, a flowchart shows a method according to an example. The method involves determining 800 a first time period during which a first head driven by a first actuator will be performing a track-following operation. The method further involves determining 801 second time period during which a second head driven by a second actuator will be performing a low-priority disk access operation that includes a seek. The first and second actuators are independently movable such that the first and second disk access operations are capable of being performed in parallel. If it is determined 802 that the seek of the second head will impact servo control of the track-following operation of the first head, a start time of the seek of the second head is changed 803 to correspond to a time that will mitigate impacts to the track-following operation of the first head. This changing 803 could also or instead involve changing a seek profile, e.g., slowing acceleration and/or deceleration of the seek of the second head.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   determining a first time period during which a first head driven by a first actuator will be performing a track-following operation;
   determining a second time period during which a second head driven by a second actuator will be performing a low-priority disk access operation that includes a seek, the first and second actuators independently movable such that disk access operations are performed in parallel by the first and second actuators;
   determining that the seek of the second head will impact servo control of the track-following operation of the first head; and
   in response to the determination that the seek will impact the first head, changing a start time of the seek of the second head to correspond to a time that mitigates impacts to the track-following operation of the first head.

2. The method of claim 1, wherein the low-priority disk access operation comprises a flush of a write queue associated with the second head.

3. The method of claim 2, further comprising, if a size of the write queue exceeds a threshold, changing the low-priority disk access operation to a high-priority disk access operation that will be scheduled without regards seeks of the second head impacting operations of the first head.

4. The method of claim 2, further comprising, if a score of the write queue exceeds a threshold, changing the low-priority disk access operation to a high-priority disk access operation that will be scheduled without regards to seeks of the second head impacting operations of the first head, the score comprising a combination of the length of each pending request in the write queue times a priority of each pending request.

5. The method of claim 1, wherein the low-priority disk access operation comprises a background operation.

6. The method of claim 1, further comprising, in response to the determination that the seek will impact the track following operation of the first head, breaking the seek of the second head into multiple seeks with an idle time therebetween, the idle time corresponding to the track-following operation.

7. The method of claim 6, wherein at least one of the multiple seeks is slowed to fit into a seek safe time period of the first head.

8. The method of claim 1, wherein the time that mitigates impacts to the track-following operation of the first head comprises a seek time of the first head before or after the track following operation.

9. The method of claim 1, wherein the time that mitigates impacts to the track-following operation of the first head comprises a time when the first head is track following but not reading or writing to a disk.

10. An apparatus, comprising:
   servo control circuitry operable to independently move first and second actuators such that first and second disk access operations are performed in parallel by respective first and second heads of the first and second actuators; and
   a system controller coupled to the servo control circuitry and operable to:
      determine a first time period during which the first head will be performing a track-following operation;
      determine a second time period during which the second head will be performing a low-priority disk access operation that includes a seek;
      determine that the seek of the second head will impact servo control of the track-following operation of the first head; and
      in response to the determination that the seek will impact the first head, change a start time of the seek of the second head to correspond to a time that mitigates impacts to the track-following operation of the first head.

11. The apparatus of claim 10, wherein the low-priority disk access operation comprises a flush of a write queue associated with the second head.

12. The apparatus of claim 11, wherein the system controller is further operable to, if a size of the write queue exceeds a threshold, change the low-priority disk access operation to a high-priority disk access operation that will be scheduled without regards seeks of the second head impacting operations of the first head.

13. The apparatus of claim 11, wherein the system controller is further operable to, if a score of the write queue exceeds a threshold, changing the low-priority disk access operation to a high-priority disk access operation that will be scheduled without regards seeks of the second head impacting operations of the first head, the score comprising a combination of the length of each pending request in the write queue times a priority of each pending request.

14. The apparatus of claim 10, wherein the system controller is further operable to, in response to the determination that the seek will impact the first head, breaking the seek of the second head into multiple seeks with an idle time therebetween, the idle time corresponding to the track-following operation.

15. The apparatus of claim 14, wherein at least one of the multiple seeks is slowed to fit into a seek safe time period of the first head.

16. The apparatus of claim 10, wherein the time that mitigates impacts to the track-following operation of the first head comprises a seek time of the first head before or after the track following operation.

17. The apparatus of claim 10, wherein the time that mitigates impacts to the track-following operation of the first head comprises a time when the first head is track following but not reading or writing to a disk.

18. A system comprising:
   first and second actuators comprising respective first and second heads, the first and second actuators independently performing first and second disk access operations in parallel over one or more disks; and
   a system controller coupled to the first and second actuators and operable to:
      determine a first time period during which the first head will be performing a track-following operation;
      determine a second time period during which the second head will be performing a low-priority disk access operation that includes a seek;
      determine that the seek of the second head will impact servo control of the track-following operation of the first head; and
      in response to the determination that the seek will impact the first head, change a start time of the seek of the second head to correspond to a time that mitigates impacts to the track-following operation of the first head.

19. The system of claim 18, wherein the time that mitigates impacts to the track-following operation of the first head comprises a seek time of the first head before or after the track following operation.

20. The system of claim 18, wherein the time that mitigates impacts to the track-following operation of the first head a time when the first head is track following but not reading or writing to a disk.

* * * * *